July 7, 1931.  J. E. McCUSKER  1,813,752
DRAFT EQUALIZER
Filed April 28, 1930
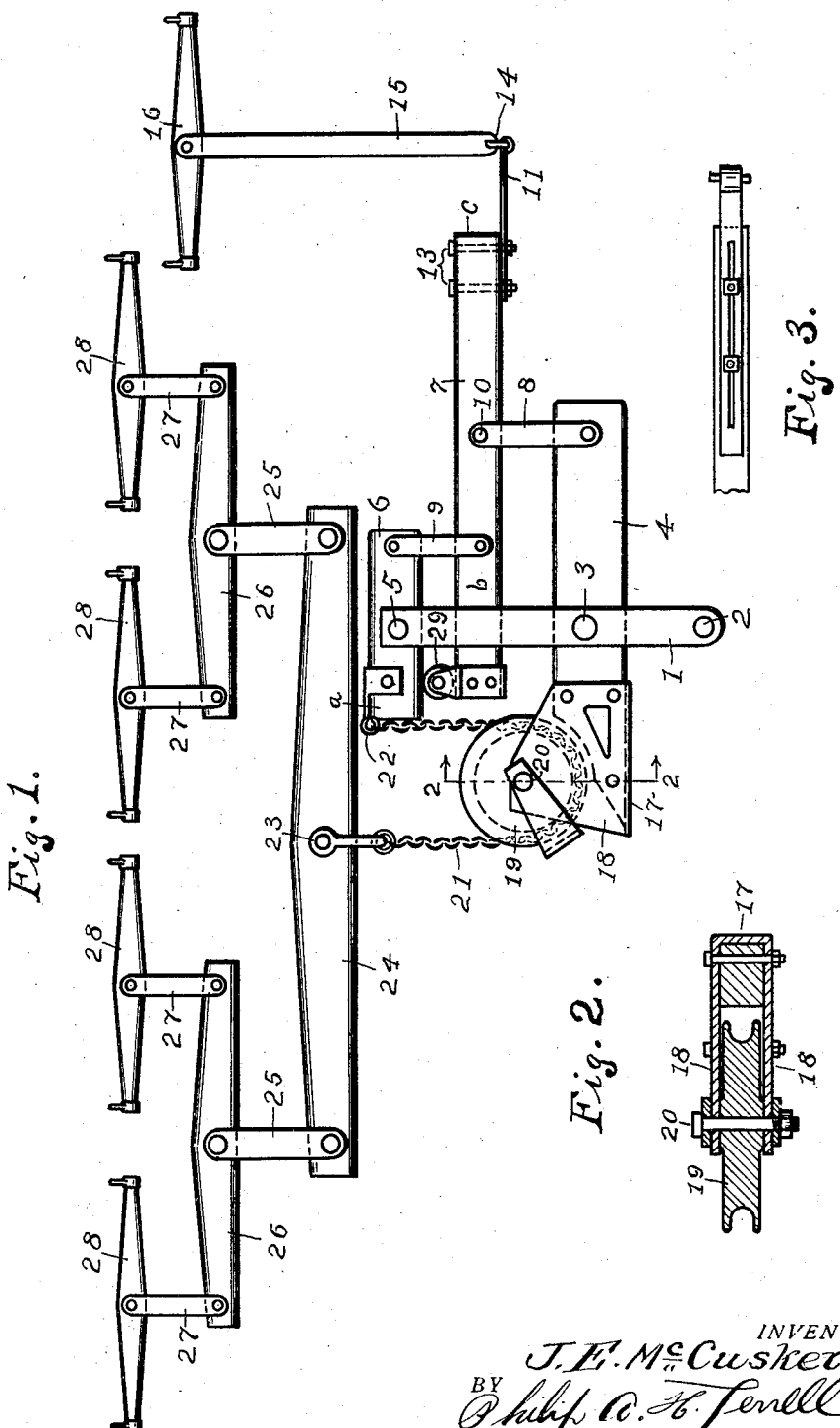
INVENTOR
J. E. McCusker
BY
Philip A. H. Sewell
ATTORNEY Patented July 7, 1931

1,813,752

UNITED STATES PATENT OFFICE

JOHN E. McCUSKER, OF OGALALLA, NEBRASKA

DRAFT EQUALIZER

Application filed April 28, 1930. Serial No. 447,955.

The invention relates to draft eveners, particularly of the five horse type, and has for its object to provide a device of this character having a leverage system whereby the draft between one of horses and the other four is automatically equalized, thereby allowing the centralization of the draft on a central draw bar located to one side of the center of the device.

A further object is to provide a five horse evener comprising a draw bar having pivoted thereto a transverse lever, one end of which has a link connection with a bar connected to the singletree for the single horse, a pivoted bar carried by the drawbar, one end of which has a link connection to the last named bar and the other end a flexible connection extending rearwardly and over a sheave carried by the transverse lever and thence forwardly and connected to a bar having doubletrees and singletrees for hitching to four draft animals.

A further object is to provide a draft equalizer comprising means to which four animals may be attached; a flexible member extending rearwardly from said means, over a sheave and then forwardly and anchored to one end of a pivoted bar carried by a drawbar; a pivoted bar mounted on the drawbar and on which the sheave is mounted; an intermediate bar having link connections with the other bars and an anti frictional roller engagement with one of them, and means whereby a draft animal may be attached to the outer end of the intermediate bar.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a plan view of the evener.

Figure 2 is a transverse sectional view taken on line 2—2 of Figure 1.

Figure 3 is a rear view of the outer end of the intermediate bar, showing the adjustable arm.

Referring to the drawings, the numeral 1 designates a drawbar which may be attached at 2 to any suitable device, for instance a gang plow, and which draw bar extends forwardly, and has pivotally connected at 3 thereto the rear transverse bar 4. Pivotally connected at 5 to the forward end of the drawbar 1 is forward transverse bar 6.

Disposed between the bars 6 and 4 is an intermediate bar 7, which has link connections 8 to the rear bar 4 and 9 to the forward bar 6, and it will be noted that said link connections 9 are closer to the draw bar 1 than the link connections 8, therefore it will be seen that upon pivotal movement of the intermediate bar 7 on its pivotal point 10 or of the bar 6, there will be a simultaneous leverage movement of said bar. The outer end of the intermediate bar 7 is provided with an adjustable plate 11 having an elongated slot 12 therein, through which securing bolts 13 extend, thereby allowing the plate to be adjusted inwardly or outwardly for adjusting and initially positioning the parts for the various draft animals. Pivotally connected at 14 to the outer end of the plate 11 is a forwardly extending bar 15 having a conventional singletree 16 at its forward end, and to which singletree, the single draft animal is to be attached in the usual manner.

Secured to one end of the rear transverse bar 4 is a U-shaped member 17 between the arms 18 of which, the sheave 19 is rotatably mounted on a pivot bolt 20, and extending over said sheave 19 is a chain 21, one end of which is anchored at 22 to the adjacent end of the forward transverse bar 6, and the other end of which extends forwardly and is connected at 23 to the transverse bar 24 centrally thereof. When four horse draft is applied to the large transverse bar 24, it will be noted that as the pivotal point 23 is centrally of the bar 24, the four horse draft will be equally distributed, consequently a forward pull is imparted on the chain 21, which in turn will impart a rearward pull on the end of the bar 6 to which the chain is connected.

Connected by means of links 25 to the ends of the large bar 24 are doubletrees 26, to the ends of which are connected by means of links 27, singletrees 28, and to which singletrees draft animals are attached. As the four draft animals impart a rearward pull on the end $a$ of the forward transverse bar 6, a forward pull is imparted on the end $b$ of the intermediate bar 7, which will force the anti frictional roller 29 of the intermediate bar into engagement with the rear side of the bar 6, and any movement transversely of bars 6 and 7 in relation to each other, will not cause binding or damage, as the anti frictional roller will freely rotate. At the same time forward pull is imparted on the end $c$ of the intermediate bar 7 by a single draft animal, and as the leverage is relatively short, the draft between the single and the four animals will be equalized.

From the above it will be seen that a draft equalizer is provided, which is simple in construction, parts reduced to a minimum.

The invention having been set forth what is claimed as new and useful is:

The combination with a five horse evener, means to which four horses may be attached, a draft bar, a transverse bar pivoted to said draftbar, a sheave carried by one end of the transverse bar, to one side of the draftbar, a flexible member attached to the four horse draft means and extending rearwardly over the sheave and forwardly, a forward transverse bar carried by the draft bar, and to one end of which the flexible member is attached, an intermediate bar, a link connection between the intermediate bar and the forward transverse bar adjacent the draft bar, a link connection between the rear transverse bar and the intermediate bar to the outside of the first mentioned link connection, means for attaching a single draft animal to the outer ends of the intermediate bar and an anti frictional roller engagement between one end of the intermediate bar and the forward transverse bar.

In testimony whereof I hereunto affix my signature.

JOHN E. McCUSKER.